Figure 1:
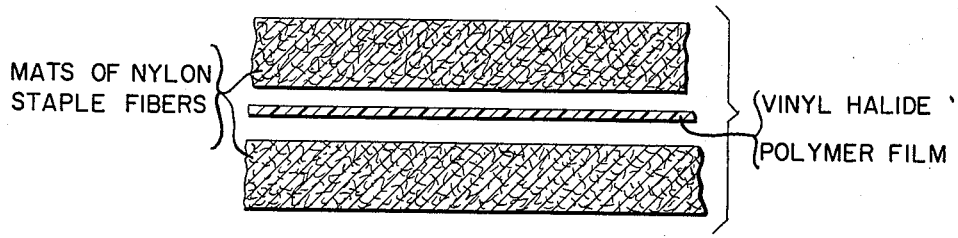

Aug. 16, 1960  E. A. RODMAN  2,949,394
SHEET MATERIAL
Filed March 17, 1954

INVENTOR
ERNEST A RODMAN

BY

AGENT

United States Patent Office 2,949,394
Patented Aug. 16, 1960

2,949,394

SHEET MATERIAL

Ernest A. Rodman, Newburgh, N.Y., assignor to E. I. du Pont de Nemours and Company, Wilmington, Del., a corporation of Delaware Filed Mar. 17, 1954, Ser. No. 416,761

2 Claims. (Cl. 154—50)

This invention relates to the production of reinforced plastic sheet materials which are adapted for use where high tear strength and toughness are desired.

This application is a continuation-in-part of my earlier application, S.N. 267,911, filed January 23, 1952, now abandoned.

Textile sheet materials prepared from natural or synthetic fibers by weaving, felting, knitting, etc., have certain inherent desirable properties such as high tensile strength. Inherent disadvantages of such textile materials for certain applications include among others, low tear strength, porosity, uneven surface and lack of uniform extensibility in all directions.

Another class of sheet materials is the homogeneous film type of sheet materials which are nonporous and impervious to certain gases and liquids, have a smooth surface and are extensible in all directions. The film type of sheet materials are inherently weaker in tensile and tear strengths as compared to a textile sheet on an equal weight basis.

It has long been desired to combine the high tensile strength of textile sheet materials with the imperviousness of film materials and to this end various combinations have been proposed. Various fibers have been combined in a variety of ways to accomplish this desideratum. A variety of surface coatings have been applied to textile sheet materials and preformed films have been laminated to the surface of woven and unwoven fabrics. Textile fibers have been mixed with film forming compositions, afterwards the mass formed into a sheet. None of these combinations have produced a product having the imperviousness and extensibility of film materials combined with the strength properties of woven textile materials.

The reinforced plastic sheets of this invention represent a new class of materials. The pliable sheet materials of this invention are characterized by high strength at low weight. At equal weight, certain combinations have 4 to 7 times the tear strength of strong fabrics, such as cotton duck and canvas, and their tensile strength is also high.

An object of this invention is the production of reinforced plastic sheets which have greatly improved physical properties. A further object is the provision of a reinforced plastic sheet pervious to air and characterized by high tear strength. A still further object is the provision of parchment-like reinforced plastic sheets impervious to air. A still further object is the provision of a bulky sheet material having a continuous film forming material on its surface.

These objects are accomplished according to the present invention by binding an assembly of one of more nylon fiber mats with a definite quantity of a suitably distributed vinyl halide polymer. In a modification of the invention a surface layer comprising a film forming material is applied to the surface of the bound nylon mat.

The nylon fibers for carrying out this invention are those prepared from synthetic linear super polyamides which are obtainable from bifunctional reactants as described in U.S. Patents 2,071,253 and 2,130,948. These polymers are capable of being formed by extrusion from hot melts into filaments which upon cold drawing show molecular orientation along the fiber axis.

The term "vinyl halide polymer" as used throughout the specification and appended claims denote homopolymers of vinyl chloride, vinyl fluoride, or copolymers of vinyl chloride or vinyl fluoride and another monomer copolymerizable therewith in which the vinyl halide is present in a predominant amount (not less than about 85%) and compositions which contain the polymer and copolymers as essential ingredients.

The terms "web" and "mat" are used synonymously throughout the specification and appended claims to define a sheet of unwoven fibers held together by interlacing or felting of the fibers.

In one of the preferred embodiments of this invention some of the fibers are oriented perpendicular to both the length and width of the mat, which is customarily appreciably smaller in thickness than in length or width. The original mat may be a single ply or a plurality of plies formed by conventional lapping or crosslapping processes. The partial perpendicular orientation required for laminar strength may be effected by passing a single ply or multiply mat one or more times through a conventional needle loom. These steps in mat formation are described at some length in patent application S.N. 312,067 filed September 29, 1952 by H. G. Lauterbach, now abandoned.

The high tear strength of the sheet material produced in accordance with this invention depends to a large extent on the degree of affinity between nylon and the vinyl halide polymers. The nylon fiber is employed for its high tenacity. The vinyl halide polymers and copolymers are employed for their critical degree of adhesion to nylon. When other binders are employed, widely varying results are obtained. When the degree of adhesion between the binder and nylon fiber is too great the nylon fibers are cemented together in such a manner that they may be broken one at a time when a stress is applied, which results in low tear strength. If the binder is too rigid the result is similar. The degree of adhesion between the nylon fibers and vinyl halide polymers results in a plastic sheet material with a tear strength much greater than that obtained with other thermoplastic materials, such as, e.g. polymethyl methacrylate and polymethyl acrylate which exhibit a welding type of adhesion to the nylon fibers. Other materials, such as, e.g. polystyrene, urea-formaldehyde, phenol-formaldehyde and alkyd resins also do not possess the proper degree of adhesion to the nylon fiber to produce high strength products.

Figure 2:
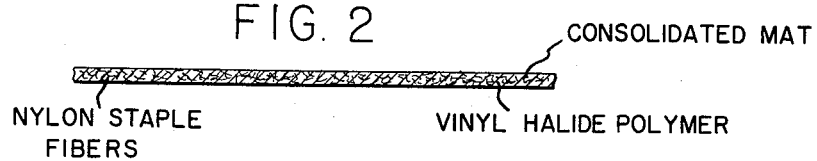
Figure 3:
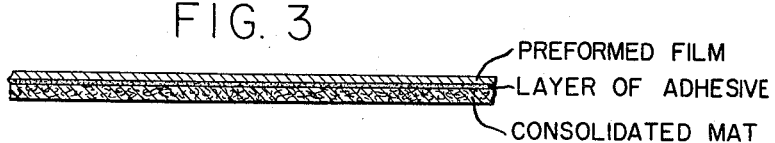
Figure 4:
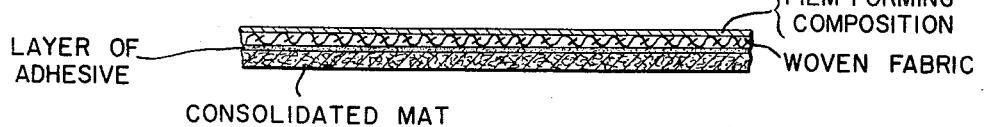

Referring to the drawing, Figure 1 is a diagrammatic cross sectional view of the separate nylon fiber mats and a preformed vinyl halide polymer film as assembled according to Example VII, prior to the laminating step. Figure 2 is also a diagrammatic cross sectional view of the assembly shown in Figure 1 after the heat and pressure treatments. Figure 3 is a diagrammatic cross sectional view of the consolidated assembly shown in Figure 2 with an adherent surface layer of a preformed film of organic film forming composition. Figure 4 differs from Figure 3 in that it shows a coated fabric as the adherent surface layer.

The following examples are illustrative of the invention. Throughout the specification and appended claims the parts and percentage figures are expressed on a weight basis.

*Example I*

A mat of nylon fibers, 3.0 denier, 1½" staple length weighing approximately 4.4 oz./sq. yd. was formed on a card. The nylon mat was placed in contact with a supported solvent wet film cast from the following composition on a temporary support of cellulosic film:

| | Percent by wt. |
|---|---|
| Polyvinyl chloride | 12.3 |
| Methyl ethyl ketone | 75.4 |
| Dioctyl phthalate | 12.3 |
| | 100.0 |

The solvent was evaporated from cast film after which it weighed approximately 2.8 oz./sq. yd. A second film of approximately the same weight was cast from the above composition on a temporary support of cellulosic film and dried by evaporating the volatile solvent. This dry cast film was placed in contact with the other side of the nylon mat while attached to the temporary support. The assembly comprised a center layer of nylon mat, a layer of plasticized polyvinyl chloride on each side of the nylon mat and two outer layers of cellulosic film. This assembly was then placed between two plies of cardboard and then placed in a press and subjected to a pressure of 500 p.s.i. at about 350° F. for a period of 5 minutes. The cardboard served to equalize the pressure on the press. After the assembly was removed from the press and allowed to cool, the cellulosic film was stripped from each side of nylon-plasticized polyvinyl chloride composite which was formed. The resulting product weighed approximately 6.8 ounces per sq. yd., contained 65% nylon fibers and 35% binder, was flexible and parchment-like in appearance and feel. The tear strength as determined by the trapezoid method described in Federal Specification CCC–T–191a dated October 8, 1945 was 26.3 lbs. in the machine direction and 72.4 lbs. in the cross machine direction. The tensile strength of a one inch strip was 95 lbs. for the machine direction and 70 lbs. for the cross machine direction.

*Example II*

A mat of nylon fibers weighing approximately 2 oz. per sq. yd. was sprayed on one side with a solution of a plasticized copolymer of vinyl chloride and vinyl acetate. The spraying composition was as follows:

| | Percent by wt. |
|---|---|
| "Vinylite" VYNS (copolymer of 90 parts of vinyl chloride and 10 parts of vinyl acetate) | 17.5 |
| Di (2-ethyl hexyl) phthalate | 10.5 |
| Methyl ethyl ketone | 72.0 |
| | 100.0 |

The sprayed mat was doubled upon itself with the sprayed surfaces in contact with each other and then pressed at 350° F. at about 500 p.s.i. for a period of three minutes. The resulting sheet contained 24.5% binder and 75.5% nylon fiber and weighed 5.3 oz. per sq. yd. It had a tensile strength of 45 lbs. per one inch strip and had a tongue tear strength of 9 lbs. The tongue tear test employed in this and succeeding examples is described in A.S.T.M. Test Method D39–49.

*Example III*

A mat of nylon fibers (3.0 denier, 1½" staple) weighing approximately 8 oz. per sq. yd. was laminated with a preformed vinyl chloride polymer film weighing approximately 20 oz. per sq. yd. and having the following formula:

| | Percent by wt. |
|---|---|
| Copolymer of 95 parts vinyl chloride, 5 parts vinyl acetate | 56.2 |
| Di (2-ethyl hexyl) phthalate | 36.6 |
| Camel wite (calcium carbonate) | 5.6 |
| Lead stearate | 1.1 |
| Heat stabilizer (coprecipitate of lead ortho silicate and silica gel) | .5 |
| | 100.0 |

The polyvinyl chloride film was prepared by the well known calender method. The lamination was carried out by pressing the fluffy nylon mat and preformed polyvinyl chloride film at 325° F. and approximately 1500 p.s.i. for 2 minutes. The nylon mat was thoroughly impregnated. One side of the composite was slightly fuzzy and the other side had the appearance and feel of a film. The nylon mat and polyvinyl chloride film were formed into an integral unit which was highly resistant to tear.

*Example IV*

The following experiment illustrates the preferred ratios of plasticizer to vinyl resin. An 8 oz. nylon mat of 3.0 denier and 1½" nylon staple in random arrangement was divided into four lengths. Each length was impregnated with a different vinyl chloride polymer composition of varying amounts of plasticizer.

In this experiment the vinyl chloride polymer binder compositions were in the form of a suspension and referred to as plastisols. The undissolved vinyl chloride polymer in powder form is dispersed in a liquid plasticizer, in the same manner in which pigments are dispersed in the plasticizer. The resin is dispersed in the plasticizer at room temperature and results in a thick paste which, if desired, may be diluted with an organic liquid which is compatible with the plasticizer and has no appreciable solvent action on the resin. When the binder composition is heated to about 300–350° F. the plasticizer becomes a solvent for the resin and converts the composition to a gelatinous cementitious condition which on cooling forms a material of high mechanical strength.

Each plastisol composition described in the table below was spread on a temporary support, in the form of film weighing about 8 oz. per sq. yd. and the 8 oz. nylon mat mentioned above was placed over each plastisol film. The assemblies were subjected to a pressure of about 500 p.s.i. at 350° F. for a period of 3 minutes. The plastisol compositions were converted to a solution of the resin in the hot plasticizer which permeated the nylon mat and formed an integral unit, weighing approximately 16.0 oz. per sq. yd.

The following table indicates the preferred ratio of resin to plasticizer for the optimum tear strength for the non-woven reinforced plastic sheet materials of the invention.

| Plastisol Composition | | Tear Strength (Tongue Tear— ASTM D39–49), lbs. |
|---|---|---|
| Powdered Polyvinyl Chloride, parts | Di (2-ethyl hexyl) Phthalate, parts | |
| 62.5 | 37.5 | 17.5 |
| 60.6 | 39.4 | 21.7 |
| 58.8 | 41.2 | 22.0 |
| 50.0 | 50.0 | 17.5 |

*Example V*

A 12 mil thick film weighing approximately 12.0 oz. per sq. yd. having the same composition as that described in Example III was placed between two uncondensed mats of nylon fibers (3.0 denier, 1½" staple) each weighing 4 oz. and the assembly passed between even speed calender rolls heated to 300° F. operating under high pressure.

The resulting sheet was comparable in strength to press laminated sheets of similar construction. The calender laminated sheet was more leathery in feel than comparable press laminated sheets.

*Example VI*

A random nylon (3.0 denier, 1½" staple) textile fiber web weighing 2 oz. per sq. yd. was made on a web forming apparatus, such as disclosed in U.S. Patent 2,451,915 issued October 19, 1948 to Francis M. Buresh.

The web was dusted with dry powdered "Vinylite" VYNS, a copolymer of 90 parts vinyl chloride and 10 parts vinyl acetate, which was covered with a second web like the first mentioned web. The composite was pressed at 350° F. for two minutes. The resulting sheet was well bonded, surprisingly soft and flexible considering there was no plasticizer present for the vinyl resin. The laminated webs weighed 4.6 oz. per sq. yd. and contained 13.0% vinyl resin and 87% nylon fiber. The sheet material was permeable to air. The tensile strength was 31 lbs. for a 1″ strip and the tongue tear strength was 7 lbs.

*Example VII*

A preformed film of plasticized polyvinyl chloride comprising 60 parts of polyvinyl chloride polymer and 37.5 to 42.5 parts of dioctyl phthalate, weighing about 5.0 oz. per sq. yd. was placed between two webs of nylon (3.0 denier, 1½″ staple) mat, each weighing approximately 5.0 oz. per sq. yd. The assembly was subjected to heat and pressure in a press for about one minute at 350° F. and about 500 p.s.i. The non-woven sheet had a higher concentration of nylon fibers on the outside than in the middle and consisted of 33.3% binder and 66.7% fiber. The final product was flexible and useful as substrates for flexible waterproof coatings, such as polyvinyl chloride coatings.

*Example VIII*

A relatively stiff non-woven sheet was prepared by assembly plies of the preformed film of polyvinyl chloride and nylon mat described in Example VII in the following order:

First ply _____ Nylon mat.
Second ply _____ Polyvinyl chloride film.
Third ply _____ Nylon mat.
Fourth ply _____ Polyvinyl chloride film.
Fifth ply _____ Nylon mat.

The above assembly was pressed for about one minute at about 350° F. and 500 p.s.i. The separate plies of the binder were welded together to form a matrix for the nylon fibers. The non-woven sheet weighed about 25.0 oz. per sq. yd. and consisted of 40% binder and 60% fiber. It was stiffer than the product described in Example VII.

*Example IX*

A needle punched nylon mat weighing 3.5 oz. per sq. yd. was impregnated with an organosol dispersion of the following composition:

|  | Percent by wt. |
|---|---|
| Polyvinyl fluoride | 42.6 |
| Dimethyl formamide | 57.4 |
|  | 100.0 |

The organosol was prepared by stirring the above composition for about 5 minutes on a high speed mixer. A smooth creamy milky white flowable organosol was obtained.

After the nylon mat was impregnated with the organosol it was heated for 10 minutes at 260° F. to evaporate the dimethyl formamide. The impregnated mat was then subjected to 2500 lbs. per sq. inch pressure for 2 minutes at 365° F. The ratio of polyvinyl fluoride to nylon fiber in the final product was about 3 to 1. The product was a fibrous parchment-like product of high tear strength. It was particularly useful in applications involving resistance to most common organic solvents, electrical insulation, anti-stick surfaces and applications requiring resistance to outdoor exposure.

*Example X*

A mat of nylon fibers weighing about 3 oz. per sq. yd. was needle loomed to the extent of about 50 punches per sq. inch. The needle punched mat was immersed in the following impregnating composition:

|  | Percent by wt. |
|---|---|
| "Vinylite" VYHH (copolymer of 85 parts vinyl chloride and 15 parts of vinyl acetate) | 10.5 |
| Di (2-ethyl hexyl) phthalate | 4.5 |
| Methyl ethyl ketone | 85.0 |
|  | 100.0 |

The impregnated mat was passed through a heat zone to expel the volatile solvent. The mat picked up sufficient impregnating composition to deposit about 2.5 dry oz. per sq. yd. of binder for the nylon fibers.

A woven cotton sateen fabric running 1.12 yds. per lb. per 58″ width was doctor knife coated with the following plastisol composition:

|  | Percent by wt. |
|---|---|
| Polyvinyl chloride | 34.4 |
| Di (2-ethyl hexyl) phthalate | 21.5 |
| Blown castor oil | 1.5 |
| Pigments | 42.6 |
|  | 100.0 |

The technique of preparing the above plastisol composition and its application to the fabric are well known and need not be repeated here. After the plastisol composition was spread on the textile fabric it was passed through a heat zone (325–350° F.) to fuse or coalesce the plastisol coating. The coated fabric is preferably decorated at this stage by printing and embossing the coating.

The back (uncoated) side of the coated fabric was doctor knife coated with the following adhesive composition:

|  | Percent by wt. |
|---|---|
| "Vinylite" VYHH (copolymer of 85 parts vinyl chloride and 15 parts of vinyl acetate) | 29.3 |
| Di (2-ethyl hexyl) phthalate | 12.6 |
| Methyl ethyl ketone | 58.1 |
|  | 100.0 |

Before all the solvent was evaporated from the above adhesive composition it was brought in contact with the impregnated nylon web by passing the two materials between rolls under slight pressure. The two materials in direct contact were passed through a heat zone to evaporate the solvent from the adhesive composition.

The impregnated mat laminated to the coated fabric had the following physical properties:

| | |
|---|---|
| Total weight | 22.7 oz./sq. yd. |
| Weight of nylon fibers | 3.0 oz./sq. yd. |
| Weight of binder for nylon fibers | 2.5 oz./sq. yd. |
| Weight of laminating cement | 3.2 oz./sq. yd. |
| Weight of woven fabric | 7.1 oz./sq. yd. |
| Weight of coating on woven fabric | 6.9 oz./sq. yd. |
| Thickness | 75 to 90 mils. |
| Tensile strength—1″ strip-lbs. (W X F) | 152 x 95. |
| Tongue tear—lbs. (W X F) | 9 x 9. |
| Schiltknecht flex test—flexes | 1,850,000. |

The tongue tear test was carried out by Method 5134 as described in Federal Specification Textile Test Methods CCC-T-191b, dated May 5, 1951.

The letters (W X F) refer to the warp and filler direction of woven fabric and in the case of non-woven fabric "W" refers to the machine direction and "F" refers to the cross-machine direction.

The Schiltknecht flex test was carried out on an apparatus described in Bulletin #105 published by Alfred Suter, 200 Fifth Avenue, New York, N. Y.

The coated fabric with the bulky web adhered on the back was ideally suited for upholstery uses. This construction makes unnecessary the use of sponge rubber and other padding in certain upholstery applications.

An alternate procedure involves applying the polyvinyl chloride plastisol composition directly onto the reinforced mat, then heating to fuse or coalesce the plastisol composition.

Example XI

A needle punched non-woven mat of nylon fibers (3.0 denier, 1½″ staple) weighing 2.8 oz. per sq. yd. was impregnated with the following composition:

| | Percent by wt. |
|---|---|
| "Vinylite" VYHH (copolymer of 85 parts vinyl chloride and 15 parts vinyl acetate) | 10.5 |
| Di (2-ethyl hexyl) phthalate | 4.5 |
| Methyl ethyl ketone | 85.0 |
| | 100.0 |

An unsupported polyvinyl chloride film 13 mils thick was laminated to the impregnated non-woven mat by applying a coat of the following cementing composition to the back side of the unsupported film.

| | Percent by wt. |
|---|---|
| "Vinylite" VYHH (copolymer of 85 parts vinyl chloride and 15 parts of vinyl acetate) | 29.3 |
| Di (2-ethyl hexyl) phthalate | 12.6 |
| Methyl ethyl ketone | 58.1 |
| | 100.0 |

The impregnated web was brought into contact with the wet cement with slight pressure. The laminate was then passed through a heat zone to remove the volatile solvent.

The unsupported polyvinyl chloride film was prepared by the well known calendering technique and its composition was as follows:

| | Percent by wt. |
|---|---|
| "Vinylite" VYNW (copolymer of 95 parts of vinyl chloride and 5 parts of vinyl acetate) | 51.7 |
| Di (2-ethyl hexyl) phthalate | 27.8 |
| Stabilizer | 2.1 |
| Pigments and Fillers | 18.4 |
| | 100.0 |

The unsupported film may be decorated by embossing and/or printing before or after it is laminated to the non-woven web.

The laminated assembly had the following physical properties:

| | |
|---|---|
| Total weight | 18.7 oz./sq.yd. |
| Weight of nylon fibers | 2.8 oz./sq. yd. |
| Weight of binder for nylon fibers | 2.0 oz./sq. yd. |
| Weight of adhesive | .8 oz./sq. yd. |
| Weight of surface film | 13.1 oz./sq. yd. |
| Thickness | 80 to 95 mils. |
| Trapezoid tear strength—lbs. (W X F) | 45/41. |
| Tongue tear strength—lbs. (W X F) | 12.0/14.5. |

The trapezoid tear test was carried out by Method 5136 as described in Federal Specification Textile Test Methods CCC–T–191b, dated May 15, 1951.

This construction was ideally suited for upholstery uses.

An alternate procedure involves calendering the polyvinyl chloride surface film directly onto the reinforced nylon mat. The reinforced nylon mats may be surfaced with vinyl fluoride polymer compositions.

The nylon fiber used in the specific examples is identified chemically as polyhexamethylene adipamide, however other high melting polyamide fibers, such as those disclosed in U.S. Patents 2,071,253 and 2,130,948 may also be used as the nylon fiber.

The ratio of nylon fibers to the vinyl halide polymer binder composition may vary over a wide range. The ratios employed in the foregoing examples are:

| | Ratio of Nylon Fiber:Binder | |
|---|---|---|
| Example I | 65.0 | 35.0 |
| Example II | 75.5 | 24.5 |
| Example III | 28.6 | 71.4 |
| Example IV | 50.0 | 50.0 |
| Example V | 40.0 | 60.0 |
| Example VI | 87.0 | 13.0 |
| Example VII | 66.7 | 33.3 |
| Example VIII | 60.0 | 40.0 |
| Example IX | 25.0 | 75.0 |
| Example X | 54.5 | 45.5 |
| Example XI | 58.3 | 41.7 |

In the specific examples several gradated constructions are illustrated. Examples I and III show a higher concentration of fiber on one side than on the other. Examples II, V and VII show a higher concentration of fibers on the outside than in the middle. The nylon fibers and binder were more uniformly distributed in Examples IV, VI, VIII and IX, than in the other examples.

The vinyl halide polymers that may be used include, in addition to polyvinyl fluoride, polyvinyl chloride and copolymers of vinyl chloride and vinyl acetate referred to in the specific examples, copolymers obtained by polymerizing vinyl chloride in the presence of other monomers copolymerizable therewith, such as the diesters of fumaric or maleic acid including dimethyl, diethyl, dipropyl, and dibutyl fumarate and maleate, copolymers of vinyl chloride and esters of acrylic and alpha-chloroacrylic acid or methacrylic esters such as the methyl, ethyl or propyl esters, and also copolymers of vinyl chloride with vinylidene chloride. These vinyl chloride copolymers and polymers can be prepared by polymerizing monomer or monomer mixtures in aqueous emulsions as is well known in the art. When copolymers are used vinyl chloride is present in major amount, usually not less than 85% vinyl chloride and not more than about 15% of the other component.

The liquid plasticizers that may be used with the vinyl chloride polymers in preparing the products of this invention include among others, dioctyl phthalate, tricresyl phosphate, di(butoxyethyl) phthalate, dibutyl phthalate, methoxy ethyl acetyl ricinoleate, sebacic acid esters such as dibutyl sebacate and di(butoxyethyl) sebacate and various combinations of plasticizers. In fact any vinyl chloride polymer plasticizer may be used as long as it does not interfere with the inherent affinity of the polyvinyl chloride to the nylon.

An alternate method which does not involve any appreciable pressure is to introduce the plasticized vinyl chloride polymer binder in the form of a solution into the pre-condensed mat of nylon fibers which permeates the fibers and binds them together upon evaporation of the solvent in the absence of pressure. After the solvent has been evaporated the sheet material may or may not be given a heat and pressure treatment.

Still another alternate method is to introduce the vinyl halide polymer binder throughout the nylon fiber mat in the form of an aqueous suspension or latex which may be fused after drying by subjecting the impregnated mat to heat and pressure and/or a solvent for the polymer.

The nylon mat or web as formed on a web forming apparatus and prior to combining with the polyvinyl halide binder, as described in the foregoing examples, is very loosely bound together and will fall apart if not handled carefully. It is usually supported on a temporary carrier until it is combined with the binder or needle loomed. Since an unsupported sheet of polyvinyl halide also has low mechanical strength the final product of this invention shows a marked synergistic effect.

The loosely bound nylon mat is placed in contact with the polyvinyl halide binder prior to the application of the heat and pressure treatments. In order to facilitate the handling of the nylon mat it may be pre-condensed to a limited extent by passing between heated pressure rolls or pressing between heated plates which compacts and increases the strength of the mat. The partially compacted mat is then placed in contact with the binder and the assembly subjected to heat and pressure.

In the preferred practice a plurality of the loosely bound nylon mats from a card or other mat forming equipment such as, e.g. an apparatus described in U.S. Patents 2,451,915, 2,477,675 or 2,478,148, are superposed in a cross-lapped arrangement at right angles. They may also be cross-lapped at acute angles or they may be placed in a parallel arrangement. The superposed mats may be subjected to heat and pressure by passing between heated pressure rolls or pressed between heated plates. The heat required must be sufficient to render the binder cementitious and yet have no appreciable effect on the nylon fibers or structural fibers.

For the purpose of this invention it is important that the nylon fibers not develop an adhesiveness at the temperature at which the binder is caused to hot flow. The nylon fiber must not lose its identity as a fiber during the processing. Nylon fiber is employed in view of its relatively high melting point (approximately 482° F.) and high tensile and tear strengths. The wide difference in temperature at which adhesiveness is developed in the nylon polymer (approximately 482° F.) and the vinyl halide polymer (approximately 300–350° F.) provides a safe operating range for the practice of this invention.

It is also possible to improve the adhesiveness of the binder by treating the nylon mat just prior to applying the heat and pressure with a volatile liquid which has a solvent action on the vinyl halide polymer.

Conventional non-woven fabrics and papers tear relatively easily when a strip is cut on one edge and the cut edges are subjected to opposing forces since the fibers are broken one at a time as the entire stress is applied to a relatively few fibers. When the reinforced plastic sheets of this invention are cut on one edge and the cut edges are subjected to opposing forces the vinyl halide polymer binder and nylon fibers stretch and the stress is distributed over a greater area than in the case of conventional sheet materials.

The time, temperature and pressure used in the specific examples may vary. Within limits, the higher the temperature used the lower is the necessary combination of pressure and time. The higher the pressure that is used, the lower is the necessary combination of temperature and time, and the longer the time used the lower is the necessary combination of pressure and temperature. For instance, where a hot rolling or calendering operation is substituted for the platen pressing, the area between the rolls is very small and the unit pressures are in the order of several thousand pounds per square inch. Accordingly, the necessary time is reduced and if the roll temperature is kept the same or slightly higher than normal pressing temperature, the time between the rolls at practical rolling speeds is adequate.

The sheets produced in accordance with the invention may be colored by standard dyeing or printing techniques. They may also be colored by application of the dye to the fibers before or after the fibers are carded into the form of a mat. Also the vinyl halide polymer may be colored by pigments and dyes before combining with the nylon fibers.

The reinforced mats of the invention may be enhanced by decorations such as printing designs on the surface, embossing and various color effects by employing different colors for the nylon fibers and the vinyl halide polymer.

The denier of the filaments which may be used in carrying out this invention may vary depending on the type and appearance of the sheet material desired. While the three denier filament is preferred, filaments having a denier of one or less may be used. Fibers having a denier of 50 to 70 produce useful sheets in accordance with this invention. The nylon fiber may be straight or crimped.

The preferred fiber length is about 1½ inches. The type of apparatus employed in forming the mat will control the fiber length more or less. Fiber lengths as low as ½ inch and as high as three inches may be used in practicing this invention.

The sheet material of this invention depending upon the ratio of nylon fiber to vinyl halide polymer and upon the conditions of pressing and heating employed, possess a wide range of properties which adapt the product for the different purposes for which continuous sheets are now used.

The sheet materials of this invention can be made in a range of weights and thicknesses and their properties have suggested used in such applications as: luggage, cases, mail sacks, protective clothing, upholstery, bookbinding, replacement for canvas, tarpaulins and waterproof ducks, power transmission belting, conveyor belts, electrical insulation, heavy duty packaging, gun covers, airplane wing covers and other aircraft uses where a high strength lightweight flexible sheet material is indicated, extra gasoline tanks for planes; covers for porch furniture, boats, canoes and exposed equipment on shipboard; high strength adhesive tapes, heavy duty raincoats, mothproof bags, army tents, sleeping bag covers, golf bags, paper currency, diaphragms, gaskets, leather replacement, basketball and football covers, shoe construction materials and shoe linings.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

I claim:

1. A plastic sheet material comprising a nonwoven mat consisting essentially of interlaced nylon staple fibers bound together with polyvinyl chloride distributed throughout said mat, said nylon fibers representing about 25% to 87% of the combined weight of nylon and polyvinyl chloride, said sheet material being characterized by high tear strength.

2. A plastic sheet material comprising a nonwoven mat consisting essentially of interlaced nylon staple fibers bound together with polyvinyl chloride distributed throughout said mat, said nylon fibers representing about 25% to 87% of the combined weight of nylon and polyvinyl chloride, and an adherent surface layer of a preformed film comprising a vinyl chloride polymer, said sheet material being characterized by high tear strength.

References Cited in the file of this patent

UNITED STATES PATENTS

| | | |
|---|---|---|
| 2,418,904 | Rugely et al. | Apr. 15, 1947 |
| 2,431,745 | Flanagen | Dec. 2, 1947 |
| 2,514,185 | Eberly | July 4, 1950 |
| 2,517,698 | Muskat | Aug. 8, 1950 |
| 2,528,235 | Loritsch | Oct. 31, 1950 |
| 2,530,441 | Reinhardt et al. | Nov. 21, 1950 |
| 2,542,819 | Kropa | Feb. 20, 1951 |
| 2,577,205 | Meyer et al. | Dec. 4, 1951 |
| 2,618,580 | Lancaster | Nov. 18, 1952 |
| 2,676,128 | Piccard | Apr. 20, 1954 |
| 2,694,744 | Tamburini | Nov. 16, 1954 |
| 2,698,574 | Dougherty et al. | Jan. 4, 1955 |
| 2,719,806 | Nottebohm | Oct. 4, 1955 |

FOREIGN PATENTS

| | | |
|---|---|---|
| 505,801 | Great Britain | May 17, 1939 |
| 547,637 | Great Britain | Sept. 4, 1942 |